(12) United States Patent
Yamamoto et al.

(10) Patent No.: US 11,493,146 B2
(45) Date of Patent: Nov. 8, 2022

(54) OPENING AND CLOSING VALVE

(71) Applicant: FUMOTO GIKEN CO., LTD., Kanagawa (JP)

(72) Inventors: Ryohei Yamamoto, Kanagawa (JP); Yuho Yamamoto, Kanagawa (JP); Naoyuki Yamamoto, Kanagawa (JP)

(73) Assignee: FUMOTO GIKEN CO., LTD., Kanagawa (JP)

( * ) Notice: Subject to any disclaimer, the term of this patent is extended or adjusted under 35 U.S.C. 154(b) by 51 days.

(21) Appl. No.: 16/745,339

(22) Filed: Jan. 17, 2020

(65) Prior Publication Data

US 2020/0232578 A1 Jul. 23, 2020

(30) Foreign Application Priority Data

Jan. 17, 2019 (JP) .............................. JP2019-005602

(51) Int. Cl.
*F16K 35/02* (2006.01)
*F16K 5/06* (2006.01)

(52) U.S. Cl.
CPC .......... *F16K 35/027* (2013.01); *F16K 5/0647* (2013.01)

(58) Field of Classification Search
CPC ...... F16K 35/027; F16K 35/02; F16K 5/0647; F16K 5/0626; F16K 5/06; F16K 5/08; F16K 31/14
See application file for complete search history.

(56) References Cited

U.S. PATENT DOCUMENTS

| | | | | |
|---|---|---|---|---|
| 1,887,344 A | | 1/1930 | Wise | |
| 1,920,511 A | * | 8/1933 | Kulicke | ................ F16K 35/027 251/97 |
| 2,064,623 A | | 1/1935 | Mueller | |
| 2,089,617 A | * | 8/1937 | Mueller | ................ F16K 35/027 251/96 |
| 2,194,714 A | | 2/1939 | Mueller | |
| 3,010,693 A | * | 11/1961 | Lamar | .................... F16K 35/027 251/96 |
| 3,292,660 A | | 10/1963 | Zarybnicky | |
| 4,078,763 A | * | 3/1978 | Yamamoto | ............ F16K 5/0647 137/315.2 |
| 5,275,200 A | | 1/1994 | Yamamoto | |
| 5,490,660 A | * | 2/1996 | Kamezawa | ........... F16K 35/027 251/96 |

(Continued)

FOREIGN PATENT DOCUMENTS

DE 1650488 A1 12/1970
DE 2527573 A1 2/1977
(Continued)

*Primary Examiner* — Umashankar Venkatesan
(74) *Attorney, Agent, or Firm* — Kratz, Quintos & Hanson, LLP

(57) ABSTRACT

In an opening and closing valve of the invention, an operation dial and a valve body housed in a main body are connected by a rotary shaft, and a regulation member having a first fitting hole engaging with a fitter in the rotary shaft is disposed in a housing space of the main body. When a second fitting hole in the operation dial is released from the fitter in the closed state, the first fitting hole is fitted into the fitter to regulate the rotation, or when the second fitting hole is fitted into the fitter, the first fitting hole is released from the fitter to achieve the rotation.

10 Claims, 12 Drawing Sheets

(56) References Cited

U.S. PATENT DOCUMENTS

| | | | | |
|---|---|---|---|---|
| 5,513,831 A * | 5/1996 | Seward | ............... | F16K 35/027 |
| | | | | 192/95 |
| 2004/0217310 A1 * | 11/2004 | Trappa | ............... | F16K 35/027 |
| | | | | 251/96 |
| 2004/0238770 A1 * | 12/2004 | Trappa | ............... | F16K 35/027 |
| | | | | 251/96 |
| 2013/0234056 A1 * | 9/2013 | Giacomini | ............ | F16K 35/027 |
| | | | | 251/96 |
| 2015/0345659 A1 * | 12/2015 | Yamamoto | ............ | F16K 5/0642 |
| | | | | 137/1 |
| 2017/0037978 A1 * | 2/2017 | Yamamoto | ......... | F01M 11/0004 |
| 2018/0231141 A1 * | 8/2018 | Feng | ....................... | F16K 31/60 |

FOREIGN PATENT DOCUMENTS

| | | | | |
|---|---|---|---|---|
| FR | 905035 A * | 6/1944 | ........... | F16K 35/027 |
| JP | 05-83560 | 11/1993 | | |
| JP | 2017-36828 A | 2/2017 | | |

\* cited by examiner

OPENING AND CLOSING VALVE

BACKGROUND OF THE INVENTION

Field of the Invention

The present invention relates to an opening and closing valve configured to operate to open and close the flow of a fluid, and more specifically relates to an opening and closing valve having a characteristic open-close operation constitution.

Description of the Background Art

In the past, the applicant has proposed an opening and closing valve that can attached to a discharge port of a liquid container. As described in Japanese Utility Model Laid-open Publication No. 83560/1993, the opening and closing valve thereof is provided with a base end part having an inflow port fora liquid in a container, an operation lever for opening and closing the valve, a valve body which is operable and closable by rotating the operation lever, and a discharge port which communicates to the inflow port when the valve is opened. Furthermore, a male thread which helically engages with a female thread formed at the discharge port of the container is formed at the base end part where the inflow port is formed at the base end.

In the case where a conventional opening and closing valve is attached to a discharge port of a container, there is a disadvantage that an operation lever of the opening and closing valve cannot be handled depending on the shape of the container or the position of the discharge port. As an example of such disadvantage, the operation lever interferes with the attachment of the opening and closing valve because a protruding portion and others exist around the discharge port, or even if the valve can be attached, the protruding portion interferes with the operation of the operation lever.

Japanese Patent Laid-Open Publication No. 2017-36828 discloses an opening and closing valve, in which the valve is capable of setting the attachment position to a given orientation. However, the opening and closing valve of the Japanese Patent Laid-Open Publication has a problem that placing the discharge port in a desired orientation causes the operation lever to be settled in a limited orientation, and thereby the discharge port and the operation lever cannot be simultaneously fixed in their desired orientations.

Even when the operation lever is moved to its closed position, a narrow gap is created because a valve body gradually moves from its closed position to its open position due to vibration of equipment where the opening and closing valve is attached, resulting in raising a possibility of liquid leakage.

SUMMARY OF THE INVENTION

It is an object of the present invention to provide an opening and closing valve that facilitates the opening and closing operation while ensuring the prevention of an unwilling switching of a valve body.

In order to solve the above problems, the present invention includes the constitution set forth in any one of following items (1)-(5):

(1) an opening and closing valve disposed in a flow passage for a fluid and configured to control flow and interruption of the fluid, including:

a main body having a valve chamber, an inflow port located upstream of the flow passage and an outflow port located downstream of the flow passage;

a valve body housed in the valve chamber and having a flow passage member where the fluid flows, and configured to switch the flow of the fluid by rotating between its open position where the flow passage member connects the inflow port to the outflow port and its closed position where the flow is blocked between the inflow port and the outflow port;

a rotary shaft, disposed along a rotation axis of the valve body, with its base end connected to the valve body;

an operation member connected to the rotary shaft to operate the rotation of the valve body between the open position and the closed position; and a regulation member housed in the main body and passing through a center of the rotary shaft to connect movably in an axial direction to the rotary shaft, so as to move between a regulation position where the rotation of the rotary shaft is regulated and a non-regulation position where the rotation is not regulated, wherein the operation member is connected movably in the axial direction to the rotary shaft so as to enable to switch between an integral rotation state where the operation member rotates together with the rotary shaft based on its moving position and a rotation-free state where the member and the shaft are mutually rotation-free, the operation member is connected movably in the axial direction to the rotary shaft so as to enable to switch between an integral rotation state where the operation member rotates together with the rotary shaft based on its moving position and a rotation-free state where the member and the shaft are mutually rotation-free, (2) the opening and closing valve according to the aforementioned item (1), wherein the regulation member is in the regulation position when the valve body is in the closed position;

(3) the opening and closing valve according to the aforementioned item (1) or (2); wherein the regulation member is in the mutually rotation-free state with respect to the operation member;

(4) the opening and closing valve according to any one of the aforementioned items (1) to (3), wherein the operation member is in the rotation-free state when the valve body is in the closed position;

(5) the opening and closing valve according to any one of the aforementioned items (1) to (4), wherein the opening and closing valve further includes a biasing member housed in the main body to bias the operation member into the rotation-free state;

(6) the opening and closing valve according to the aforementioned item (5), wherein between the operation member and the main body, provided is rotation regulating means for regulating the rotation of the operation member in the rotation-free state; and (7) the opening and closing valve according to the aforementioned item (5) or (6), wherein the regulation member is biased toward the regulation position by the biasing member.

In accordance with the present invention defined in claim 1, the operation member is rotated to switch the position of the valve body between the open position and the closed position. Moving the operation member in an axial direction with respective to the rotary shaft enables to switch the state of the operation member between an integral rotation state to rotate together with the rotary shaft and a rotation-free state where a rotation torque of the operation member is not transmitted to the rotary shaft. The regulation member is movable in the axial direction with respect to the rotary shaft, as with the operation member. Moreover, when the operation member is moved in the axial direction to be shifted into the integral rotation state, the regulation member moves to a deregulation position where the regulation of the rotary shaft is eliminated. By contrast, when the operation member is in the rotation-free state, the regulation member moves to the regulation position.

In the case where the operation member is in the rotation-free state, when the operation member is erroneously rotated, the rotation torque is not transmitted to the valve body due to the rotation-free state, resulting in failing of switching of the valve body. Because the rotation of the valve body is regulated by the regulation member, a disadvantage such as unwilling switching of the valve body caused by vibration or others can be prevented.

In accordance with the present invention defined in claim 2, the regulation member ensures to keep the valve body in the closed position, so that the rotation of the valve body caused by such as vibration is prevented, thereby preventing fluid leakage that would otherwise be caused by unwilling rotation of the valve body.

In accordance with the present invention defined in claim 3, the regulation member is in a mutual rotation-free state relative to the operation member. Thus, even when the operation member is erroneously rotated, the regulation member is not affected by the rotation of the operation member and can therefore retain the regulation of the rotation of the rotary shaft.

In accordance with the present invention defined in claim 4, the operation member is in the rotation-free state when the valve body is in the closed position, in which case, if the operation member is erroneously rotated, a rotation torque is not transmitted to the valve body, and thereby the valve body is retained in the closed position to prevent the fluid leakage.

In accordance with the present invention defined in claim 5, the operation member is biased by the biasing member to a position where the operation member is in the rotation-free state at any time. Thus, the rotation-free state is securely maintained to prevent an erroneous switching of the valve body.

In accordance with the present invention defined in claim 6, the rotation regulating means regulates the rotation of the operation member, so as to securely prevent an operation error of the operation member.

In accordance with the present invention defined in claim 7, the biasing member biases the regulation member toward the regulation position to thereby ensure the prevention of the unwilling switching of the valve body.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Figure 1:
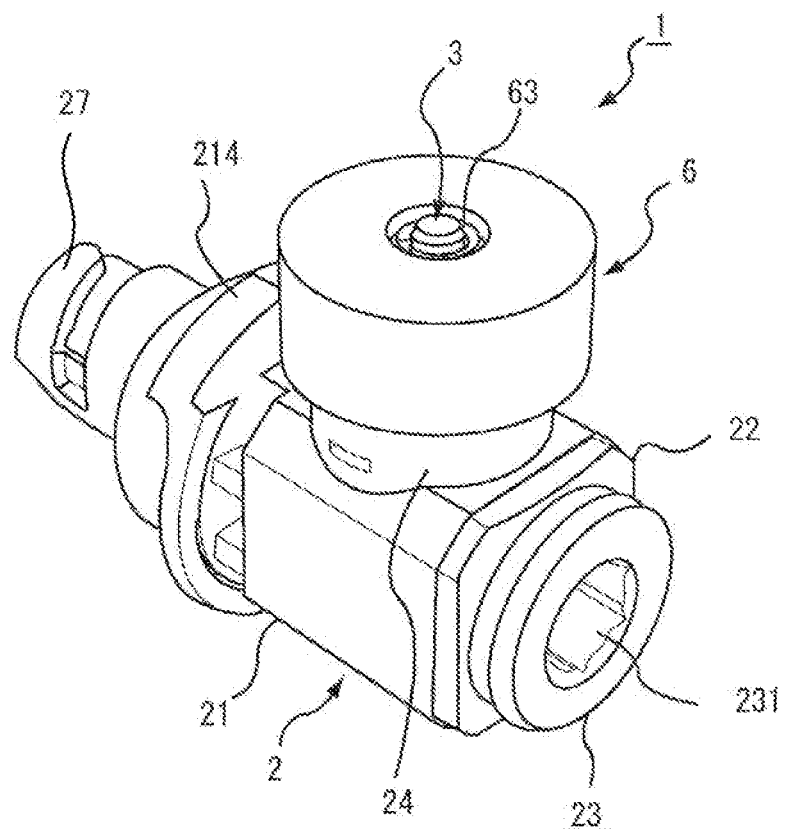
FIG. 1 shows an overall perspective view of an opening and closing valve according to an embodiment of the present invention.
Figure 2:
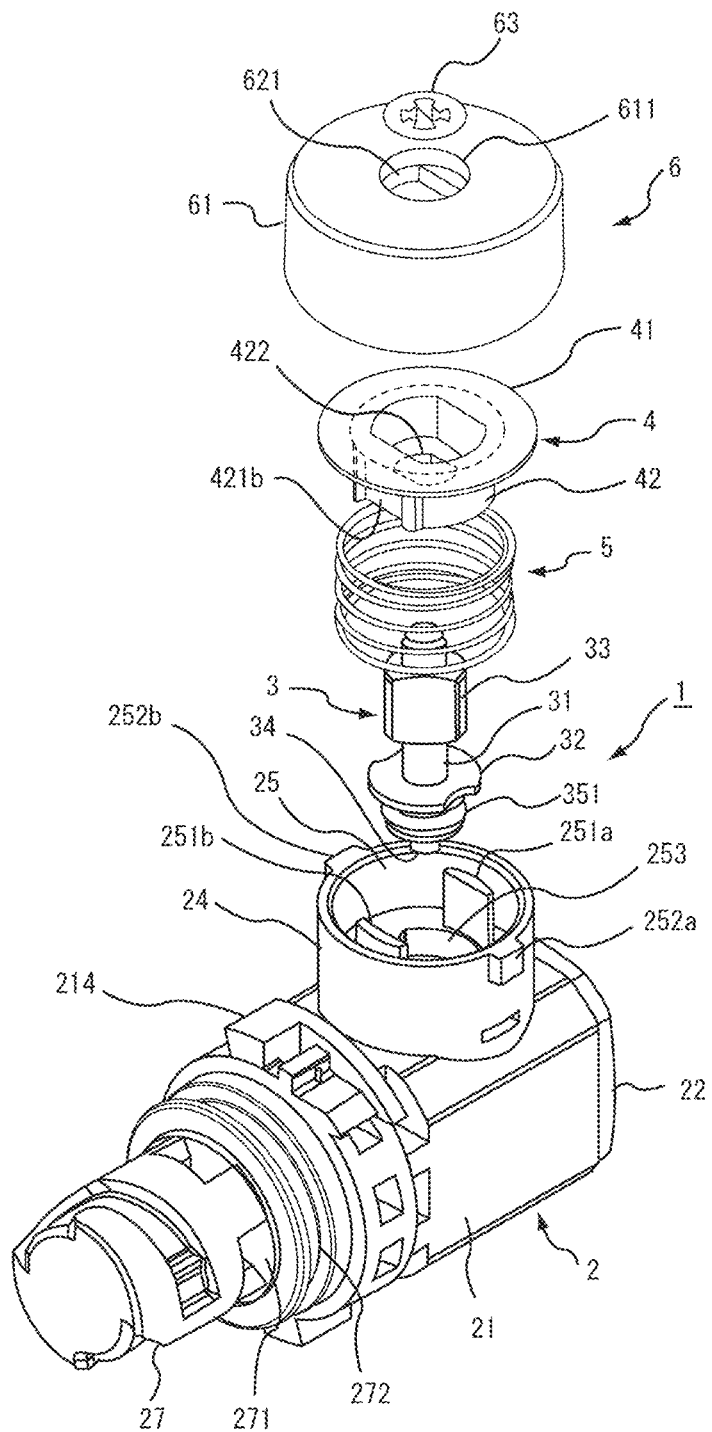
FIG. 2 shows an exploded perspective view of the opening and closing valve shown in FIG. 1.
Figure 3:
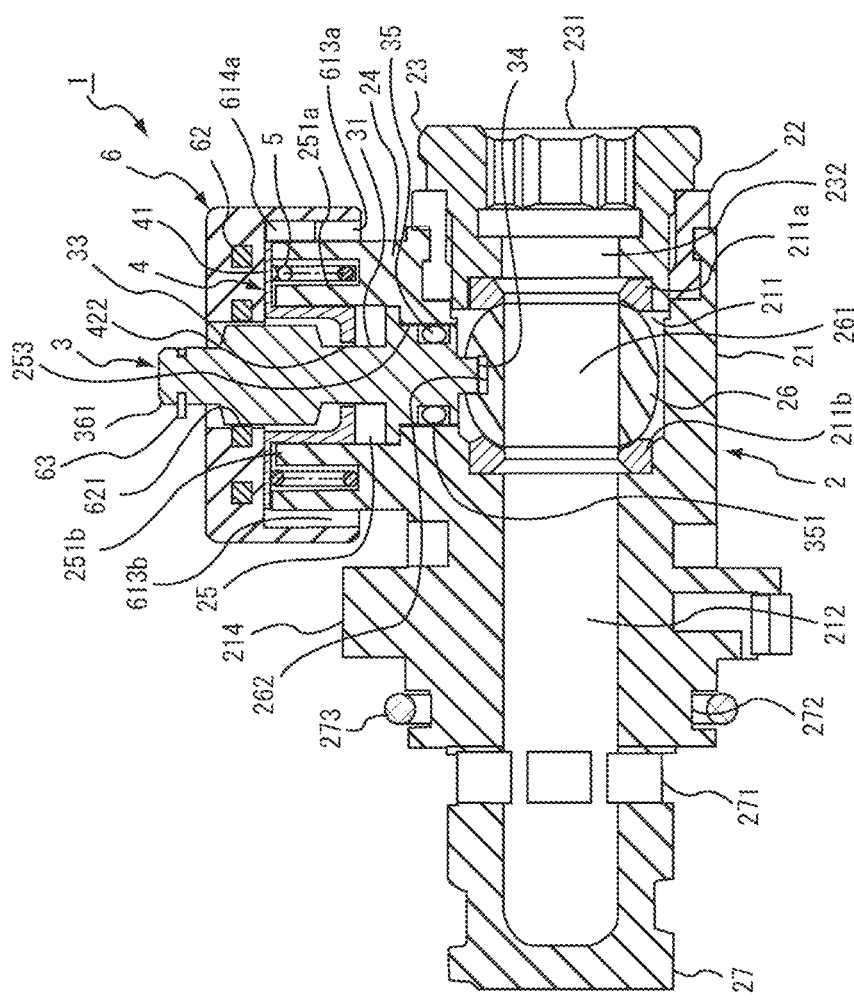
FIG. 3 shows a sectional side view of the opening and closing valve according to the embodiment when a valve body is in its open position.
Figure 4:
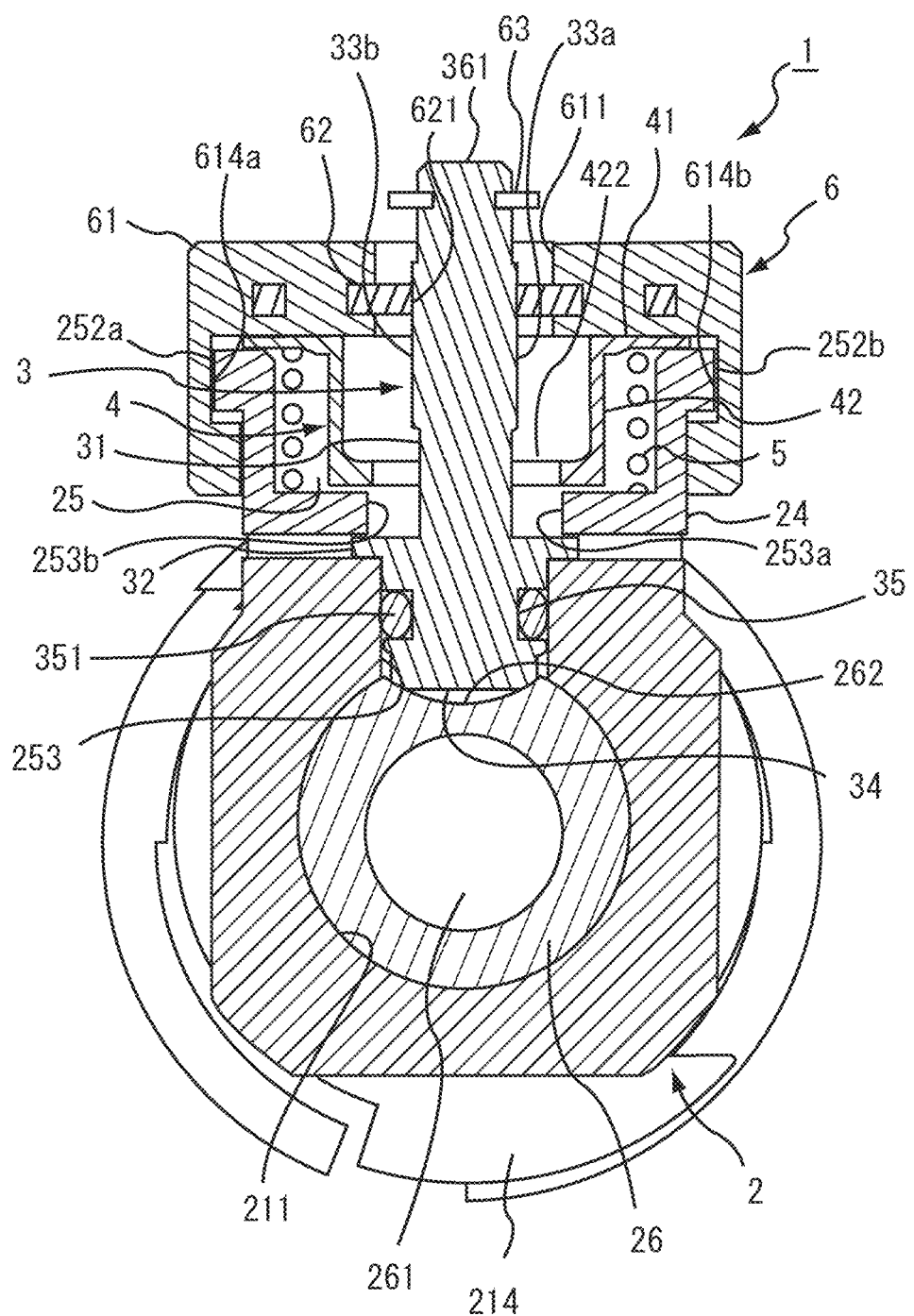
FIG. 4 shows a sectional front view of the opening and closing valve according to the embodiment when the valve body is in the open position.

Preferred embodiments of the present invention will be described below with reference to the attached drawings. FIG. 1 is an overall perspective view of an opening and closing valve according to an embodiment of the present invention, FIG. 2 is an exploded perspective view of the opening and closing valve, FIG. 3 is a side cross sectional view of the opening and closing valve in its open state, and FIG. 4 is a front cross sectional view of the opening and closing valve in the open state.

An opening and closing valve 1 according to the embodiment shown in these Figures includes a main body 2, a rotary shaft 3, a regulation member 4, a spring 5 and an operation dial 6. In this embodiment, the main body 2, the regulation member 4 and the operation dial 6 are made of resin while the rotary shaft 3 and the spring 5 are made of metal, but they are not limited thereto though.

The main body 2 includes an approximately rectangular parallelepiped valve body storage 21, an open threaded part 22 fitted into an opening communicated to a valve chamber 211 formed inside the valve body storage 21, and a lid body 23 screwed into the open threaded part 22. The main body further includes a mount 27 formed on the opposite side of the lid body 23 with respect to the valve chamber 211, an inflow passage 212 formed inside the main body 21 extending from the mount 27 toward the valve chamber 211, and a shaft housing 24 formed in a direction perpendicular to an axis of the inflow passage 212.

The metallic open threaded part 22 is fitted in the valve body storage 21 in the main body 2 on its discharging side. The metallic lid body 23 is screwed into a female screw formed inside the open threaded part 22. In the axial direction of the lid body 23, formed is an outflow passage 232, of which one end is open on the side of the valve chamber 211 and the other end is formed as a discharge port 231 for draining liquid. In addition to that, on the periphery of the opening formed at one end of the outflow passage 232 on side of the valve chamber 211, a sealing member 211a is interposed between the periphery surface and the valve body 26.

The inflow passage 212 has its one end open toward the valve chamber 211, and on the periphery of the opening thus formed, a seal member 211b is interposed between the periphery surface and the valve body 26. The other end of the inflow passage 212 extends into the mount 27, and the mount 27 has its base end section provided with a plurality of inflow ports 271 equally spaced in a circumferential direction. On a further base end side of the inflow port 271, the mount 27 is provided with a groove 272 in the circumferential direction for fitting therein a mount seal member 273. Furthermore, on the base end side of the groove 272, an attaching flange 214 is provided. To the attaching flange 214 attached is a circular member with engage nails formed thereon that engage with nails formed on the periphery of the discharge port of the liquid container. The engagement between the engage nails and the nails on the container side enables the main body 2 to be fixed on the liquid container side. The mount 27 protrudes into the liquid container, so as to allow the inflow ports 271 to be opened inside the liquid container.

The valve body 26 is stored in the valve chamber 211, The valve body 26 is spherical in shape and provided with a hole at its center, through which a flow passage 261 is formed. As shown in FIGS. 3 and 4, when the valve body 26 is in its open position, both ends of the flow passage 261 are respectively connected to the inflow passage 212 and the outflow passage 232, thereby allowing the inflow passage 212, the flow passage 261 and the outflow passage 232 to be connected one another. In this condition, through the opening and closing valve 1 a liquid in the liquid container is discharged outside. When the valve body 26 is in its open position, the cylindrical shaft housing 24 is formed in a direction orthogonal to a through straight discharge passage composed of the inflow passage 212, the flow passage 261 and the outflow passage 232, and a housing space 25 is formed for housing the rotary shaft 3 therein.

The bottom of the housing space 25 has a connection hole 253 formed between the bottom and the valve chamber 211. In addition, the bottom of the housing space 25 is provided with engagers 251a, 251b on the outflow port 231 side and the inflow port 271 side through the connection hole 253. The engagers 251a, 251h are placed in the direction orthogonal to the axis of the discharge passage, and the opposing planes are erected parallel to each other. Each engager 251a, 251b serves as guide rails configured such that both side edges are parallel to each other. The lateral surface of each engager 251a, 251b is formed on an arc-like circumferential surface along the inner circumferential surface of the housing space 25, and the spring 5 as biasing member is inserted in a gap between the engagers 251a and 251b.

In the connection hole 253, the rotary shaft 3 is rotatably fitted. The base end of the rotary shaft 3 has an engage convex part 34 protruding therefrom, which engage convex part 34 has a cross section in the form of rectangular and engages with an engage groove 262 in the valve body 26. The engage groove 262 is provided in a direction orthogonal to the rotation axis of the spherical valve body 26 and is configured to be connected with the rotary shaft 3 along the rotation axis. The engagement between the engage groove 262 and the engage convex part 34 allows the rotary shaft 3 and the valve body 26 to integrally rotate about the rotation axis.

Figure 5:
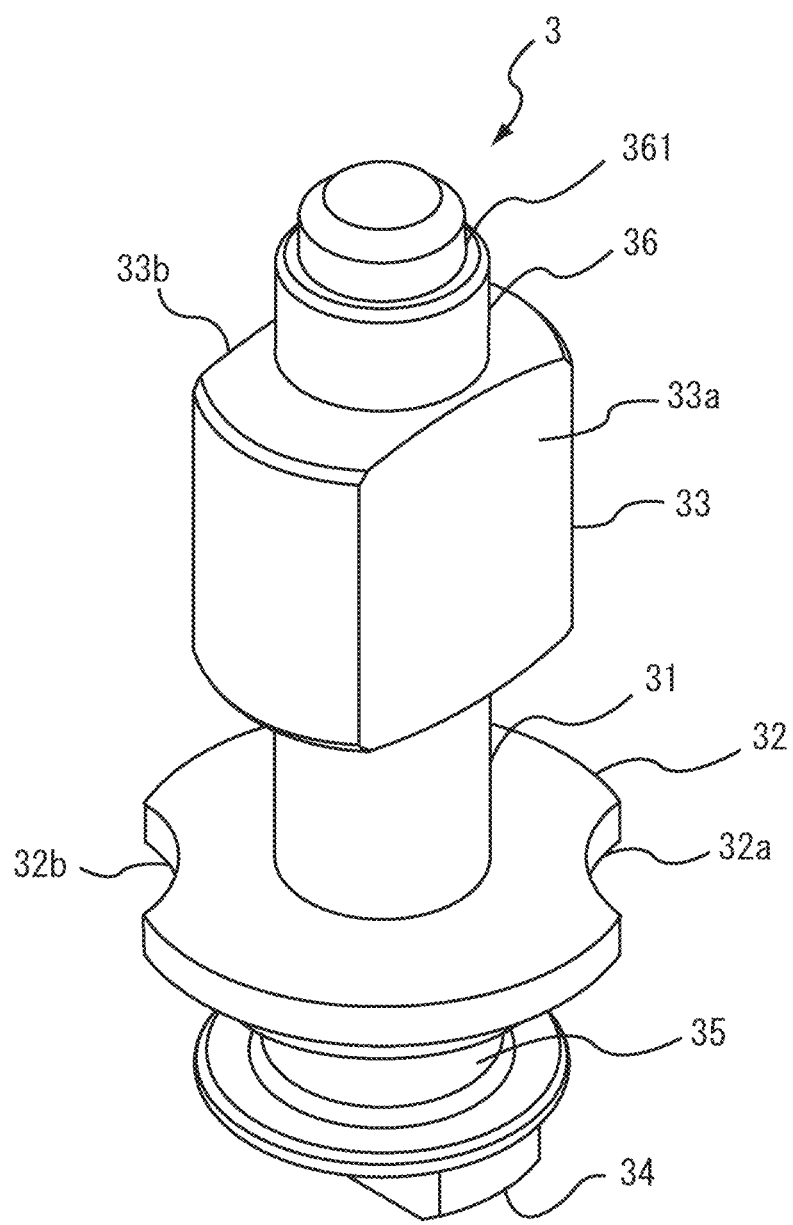
FIG. 5 shows an overall perspective view of a rotary shaft included in the opening and closing valve according to the embodiment.

As shown in FIG. 5, the rotary shaft 3 has a shaft portion 31 with a circular cross section, a disk-like jaw 32 formed on the base end side of the shaft portion 31, a retainer 35 formed on the base end side of the jaw 32, the engage convex part 34 formed on an end face on the base end side of the retainer 35, a fitter 33 provided on a tip end side of the shaft portion 31, and a tip shaft portion 36 disposed on a tip side of the fitter 33. The retainer 35 is configured by a groove formed in the circumferential direction, on which retainer 35 a shaft seal member 351 is retained. The engage convex part 34, the retainer 35, the jaw 32, the shaft portion 31, the titter 33 and the tip shaft portion 36 are sequentially arranged in line.

The retainer 35 is inserted into the connection hole 253 while retaining the shaft seal member 351. The jaw 32 abuts the bottom of the housing space 25, and the shaft portion 31 and the lower portion of the fitter 33 are housed in the housing space 25. The fitter 33 is a regulated part for regulating the rotation of the rotary shaft 3 and consists of two plane surfaces 33a, 33b in parallel to each other which are regulation surfaces for regulating the rotation of the rotary shaft 3. The shape of the cross section of the fitter 33 can be, for instance, polygonal, oval or circular with its center off from the center of rotation of the rotary shaft 3. The size of the cross section of the fitter 33 and the shape of the cross section of the fitter 33 are constantly configured toward the axial direction. The respective diameters of the shaft portion 31 and the tip shaft portion 36 are designed to be smaller than the thickness of the fitter 33 (i.e., distance between two plane surfaces 33a and 33b). The tip shaft portion 36 is provided with a groove on its outer circumferential surface, in which groove a stopper mount 361 is provided. The stopper mount 361 is fitted in a ring-like stopper 63.

Figure 6:
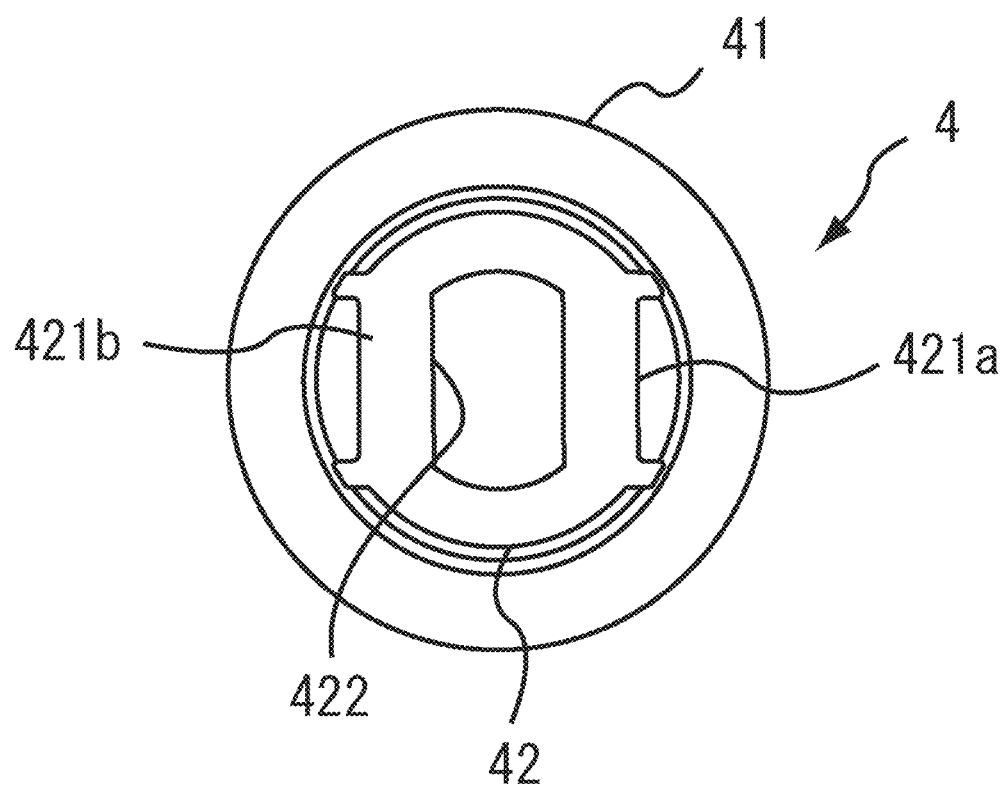
FIG. 6 shows a bottom view of a regulation member included in the opening and closing valve according to the embodiment.

The fitter 33 in the rotary shaft 3 is slidably fitted in a first fitting hole 422 of the regulation member 4. As shown in FIG. 6, the regulation member 4 has a cylindrical body 42, the first fitting hole 422 which is formed on the bottom of the cylindrical body 42, a flange 41 formed on a rim of an upper opening of the cylindrical body 42, and guide grooves 421a, 421b formed on the outer circumferential surface of the cylindrical body 42, opposing to each other.

The flange 41 has its outer circumference formed to be larger than the inner circumference of the housing space 25, and the upper end of the spring 5 abuts the lower side of the flange 41. The pair of guide grooves 421a, 421h disposed on the outer circumference of the cylindrical body 42 are engaged with the engagers 251a, 251b, and the engagement between the guide groove 421a, 421b and the engager 251a, 251b regulates the rotary drive of the regulation member 4 about the rotation axis. Because the guide grooves 421a, 421b respectively engage with the engagers 251a, 251b movably in the direction of the rotation axis, the regulation member 4 can be disposed movably in the axial direction with respect to the rotary shaft 3.

When the regulation member 4 moves in the direction of the rotation axis, the rotary shaft 3 and the regulation member 4 rotate together in the state where the first fitting hole 422 is fitted to the fitter 33 because the cross section of the first fitting hole 422 is made to have a similar shape to that of the fitter 33. That is to say, because the rotary drive of the regulation member 4 is regulated, the regulation member 4 is configured to lock the rotation of the rotary shaft 3 when the first fining hole 422 is fitted in the fitter 33.

Furthermore, as shown in FIGS. 3 and 4, when the regulation member 4 moves in the direction of the base end of the rotary shaft 3 and the first fitting hole 422 consequently comes out from the fitter 33 to move to the location of the shaft portion 31, the rotation regulation on the rotary shaft 3 by the regulation member 4 is eliminated, thereby allowing the rotary shaft 3 to rotate.

Figure 7:
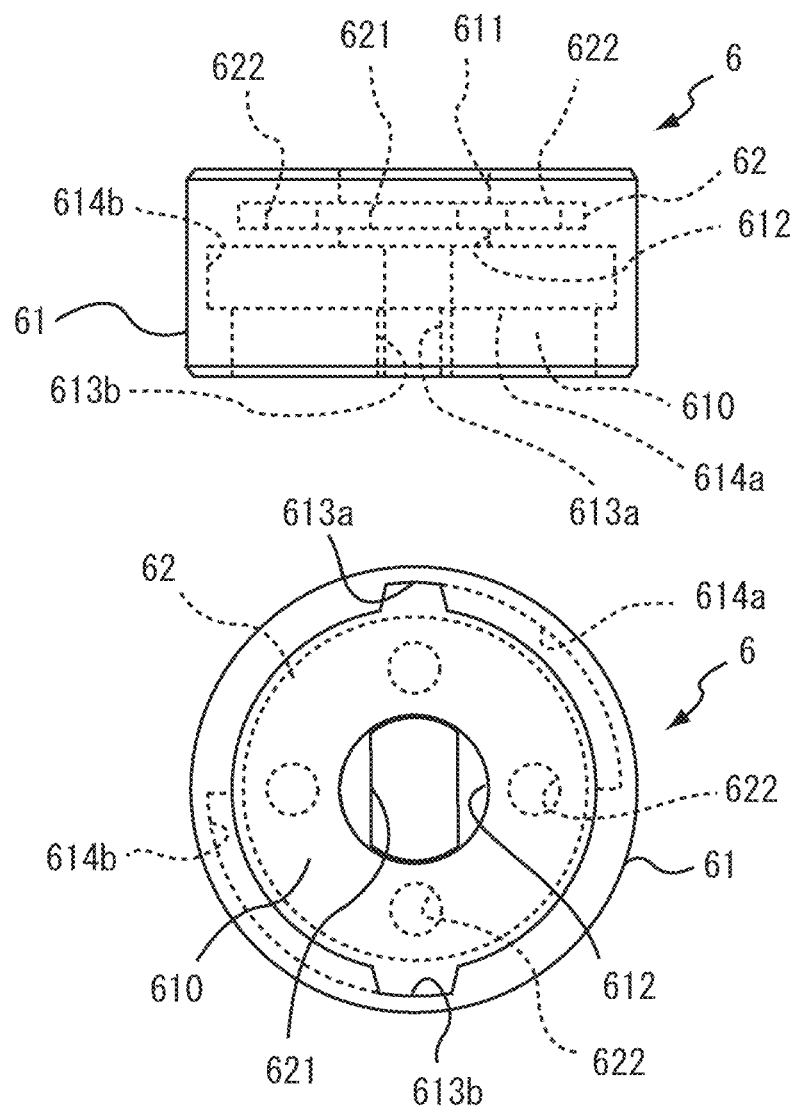
FIG. 7 shows a side view and a bottom view of an operation dial included in the opening and closing valve according to the embodiment.

The housing space 25 housing therein the rotary shaft 3, the regulation member 4 and the spring 5 has its tip opening covered by the operation dial 6 of an operating member. As shown in FIG. 7, the operation dial 6 includes a cylindrical dial body 61 and a metallic embedded member 62 embedded in the dial body 61. The dial body 61 is formed of cylindrical with an opening on its lower side, and the embedded member 62 is embedded inside its ceiling portion. The embedded member 62 is provided with a plurality of holes 622, so as to ensure the integrity with the dial body 61. The ceiling portion is provided with outer holes 611 on the top center, and is provided with inner holes 612 on the inner side, opposing to the outer holes. Between the respective outer holes 611 and their corresponding inner holes 612, formed is a second fitting hole 621 penetrated at the center of the embedded member 62. The cross section of the second hole 621 has a similar shape to that of the fitter 33 in the rotary shaft 3.

The inner diameter of the lower opening of the dial body 61 is designed to be almost the same as the outer diameter of the shaft housing 24. The shaft housing 24 is provided on its upper outer circumference with engage convex portion 252a, 252b protruding outward at a position where they face each other. On the inner circumferential surface of the dial body 61, at the position facing each other, groove-like engage concave portions 613a, 613h and other engage concave portions 614a, 614h are formed. The engage concave portion 613a, 613h are formed in the axial direction from the opening end toward the ceiling portion, and the engage concave portions 613a, 613b reaching the ceiling portion are in turn connected to the engage concave portions 614a, 614b formed in the circumferential direction.

The engage convex portions 252a, 252b are formed to have different widths, and the shape of the cross section of the engage concave portions 613a, 613b are made to conform to respective widths of the convex portions. More specifically, the engage concave portion 613a is configured to engage with the engage convex portion 252a, and the engage concave portion 613b is configured to engage with the engage convex portion 252b, in order to prevent the operation dial 6 from being attached in a wrong way during its assembly. With such configuration, the operation dial 6 cannot be rotated when the engage convex portions 252a and 252b are placed in the engage concave portions 613a and 613b, respectively. By contrast, when the operation dial 6 is pushed in the direction of the main body 2 to place the engage convex portions 252a and 252b in the engage concave portions 614a and 614b, respectively, the dial body 6 can be rotated within the range where the engage concave portions 614a, 614b are formed. In the configuration shown in the Figures, the dial body 6 can be rotated within 45 degrees.

In the rotary shaft 3 extending through the second fitting hole 621, the tip shaft portion 36 protrudes outside the operation dial 6, and the operation dial 6 consequently moves in the axial direction to allow the second fitting hole 621 to be fitted into the fitter 33 or to release the second fitting hole 621 from the fitter 33. When the second fitting hole 621 is fitted in the fitter 33, the operation dial 6 and the rotary shaft 3 can be rotated together.

To the stopper mount 361 in the rotary shaft 3 protruding outside the operation dial 6, a stopper 63 is attached to prevent the operation dial 6 from coining out from the rotary shaft 3. The operation dial 6 and the regulation member 4 are always biased toward the tip of the rotary shaft 3 by the spring 5, and thus the stopper 63 receives the biasing force of the spring 5.

When the rotary shaft 3 is placed in the housing space 25, the retainer 35 attached with the shaft seal member 351 is inserted in the connection hole 253. On the bottom of the housing space 25, arc-like protruding portions 253a, 253b protruding inwardly are provided around the opening of the connection hole 253. The jaw 32 in the rotary shaft 3 is arranged below the protruding portions 253a, 253b to prevent the rotary shaft 3 from getting out of the housing space 25 due to the biasing force of the spring 5.

Figure 8:
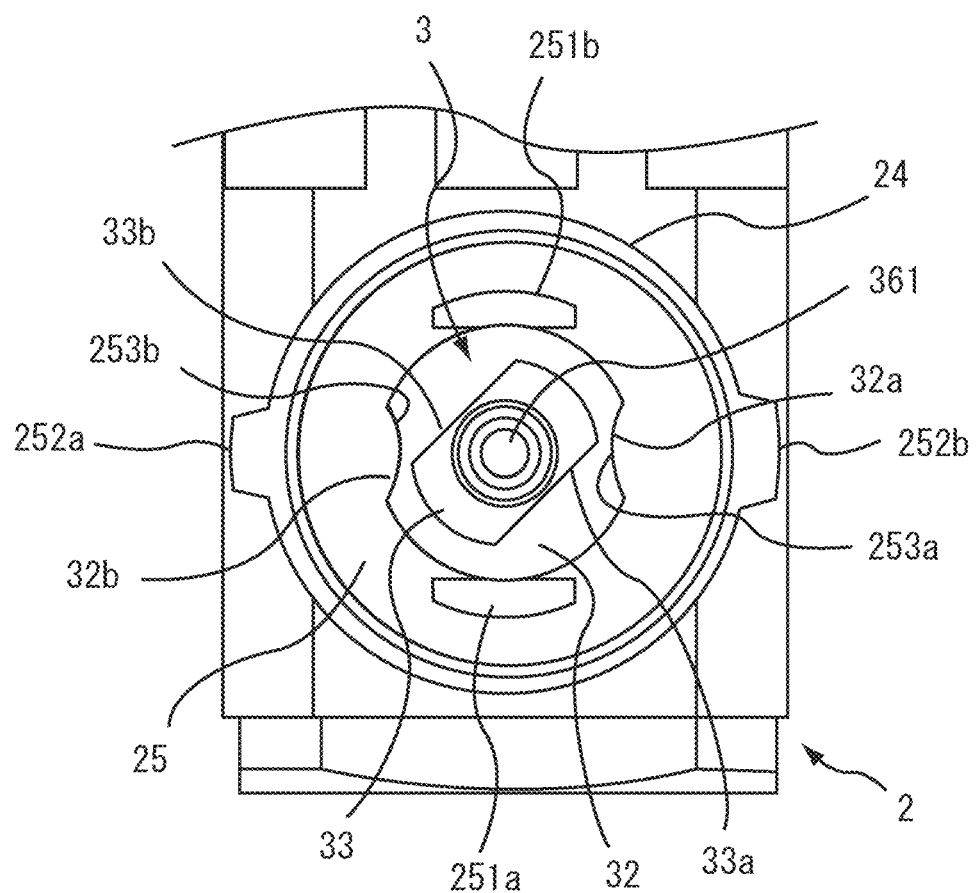
FIG. 8 shows a plane view illustrating an interior of a housing space in the opening and closing valve according to the embodiment.
Figure 9:
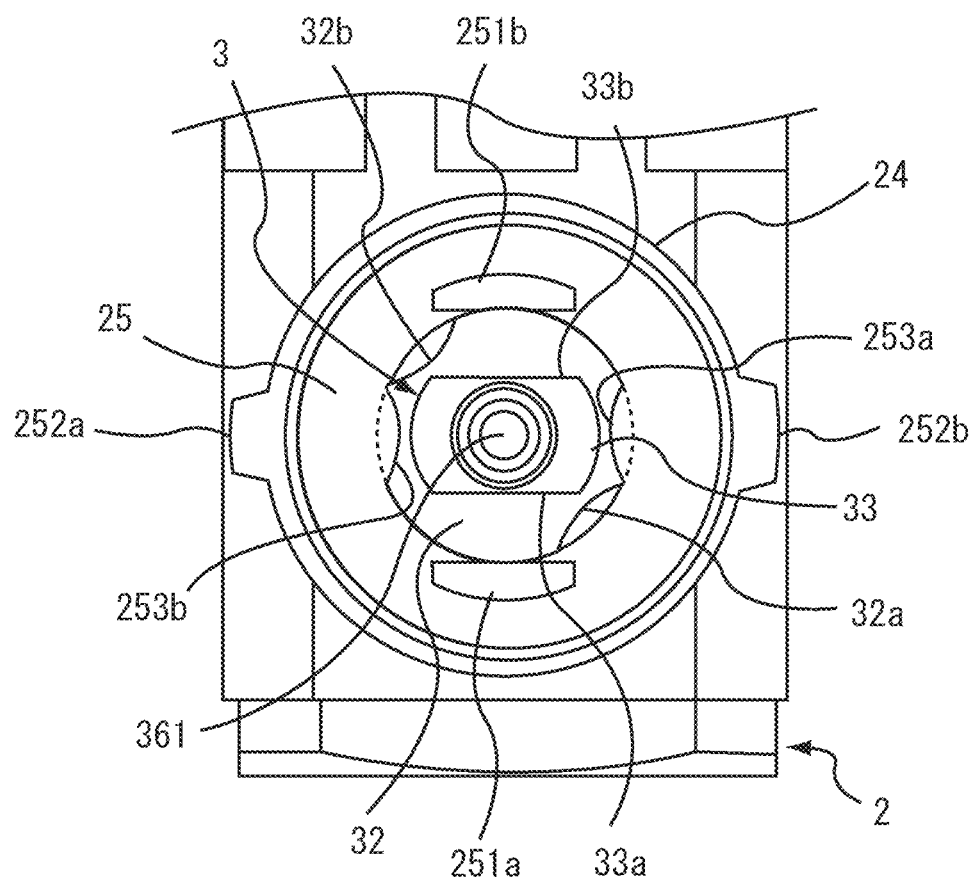
FIG. 9 shows another plane view illustrating an interior of the housing space.
Figure 10:
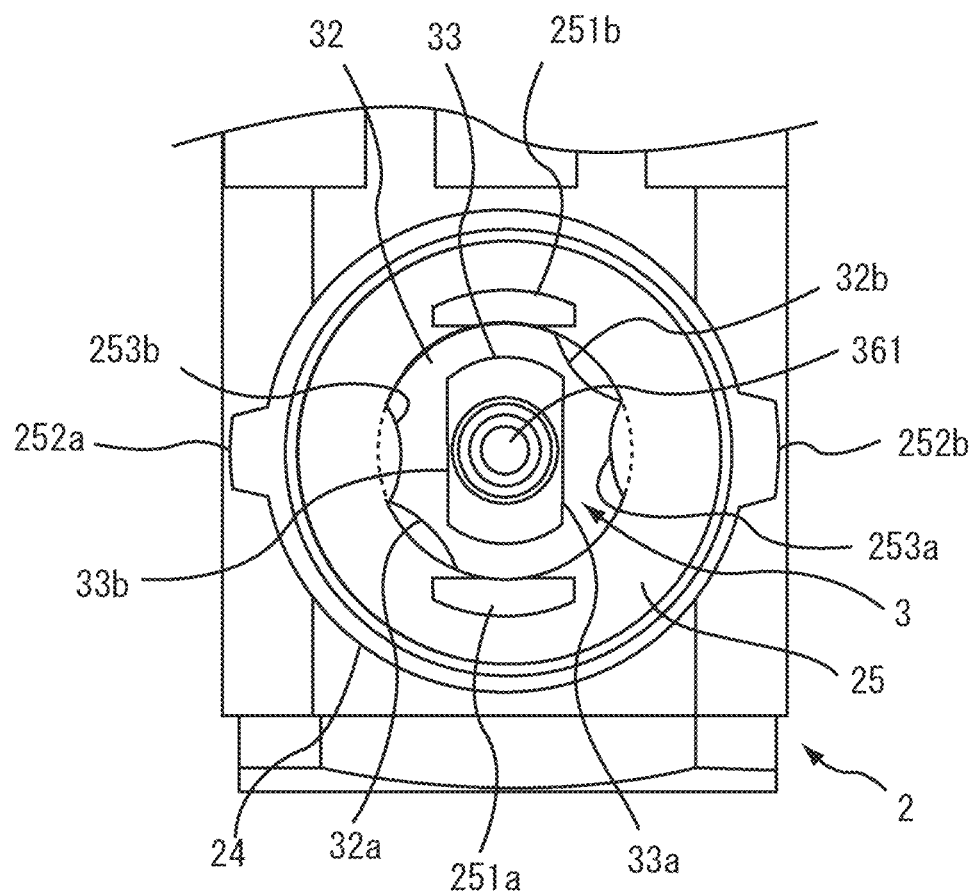
FIG. 10 shows a further another plane view illustrating an interior of the housing space.

FIGS. 8 to 10 show plane views of the housing space 25. As shown in FIG. 5, on the edge of the outer circumference of the jaw 32, arc-like concave portions 32a, 32b cut out in a similar shape to the protruding portions 253a, 253b are formed at the opposing positions. When the retainer 35 is inserted into the connection hole 253, the rotational position of the rotary shaft 3 is adjusted such that the concave portions 32a and 32b are aligned with the protruding portions 253a and 253b, respectively. The rotational position is a partly open position where the valve body 26 locates at 45 degrees with respect to the flow direction of the liquid.

At this rotational position, the rotary shaft 3 is inserted in the connection hole 253 and pushed until the engage convex part 34 engages with the engage groove 262 of the valve body 26 and the jaw 32 in turn reaches the underside of the protruding portions 253a, 253b. Then, the rotary shaft 3 is rotated by 45 degrees to the position where the valve body 26 is located in the closed position (the state shown in FIG. 9), the concave portions 32a, 32b come off from the positions of the protruding portions 253a, 253b, and thereby the edge of the jaw 32 gets under the protruding portions 253a, 253b, In this state, the spring 5 and the regulation member 4 are placed in the housing space 25 in this order, and then covered by the operation dial 6. The operation dial 6 is configured in such a way that when the engage concave portions 613a, 613b are in the rotational positions corresponding to the positions of the engage convex portions 252a, 252b, the second fitting hole 621 is fitted into the fitter 33 concurrently. The assembly work will be finished when the stopper 63 is attached to the stopper mount 361 while the tip shaft portion 36 in the rotary shaft 3 is protruded from the second fitting hole 621.

The engage concave portions 614a, 614b formed on the operation dial 6 regulate the rotation range of the operation dial 6 in the assembled state, which rotation range for opening and closing the operation dial 6 is 45 degrees. In this rotation range, since the concave portions 32a, 32b of the jaw 32 rotate within a range where they do not overlap the protruding portions 253a, 253b (the range of 45 degrees at the positions shown in FIGS. 9 and 10), the circumferential edge of the jaw 32 is configured to be located under the protruding portions 253a, 253b at any time. In such an assembled state, the rotary shaft 3 cannot come out from the housing space 25.

Figure 11:
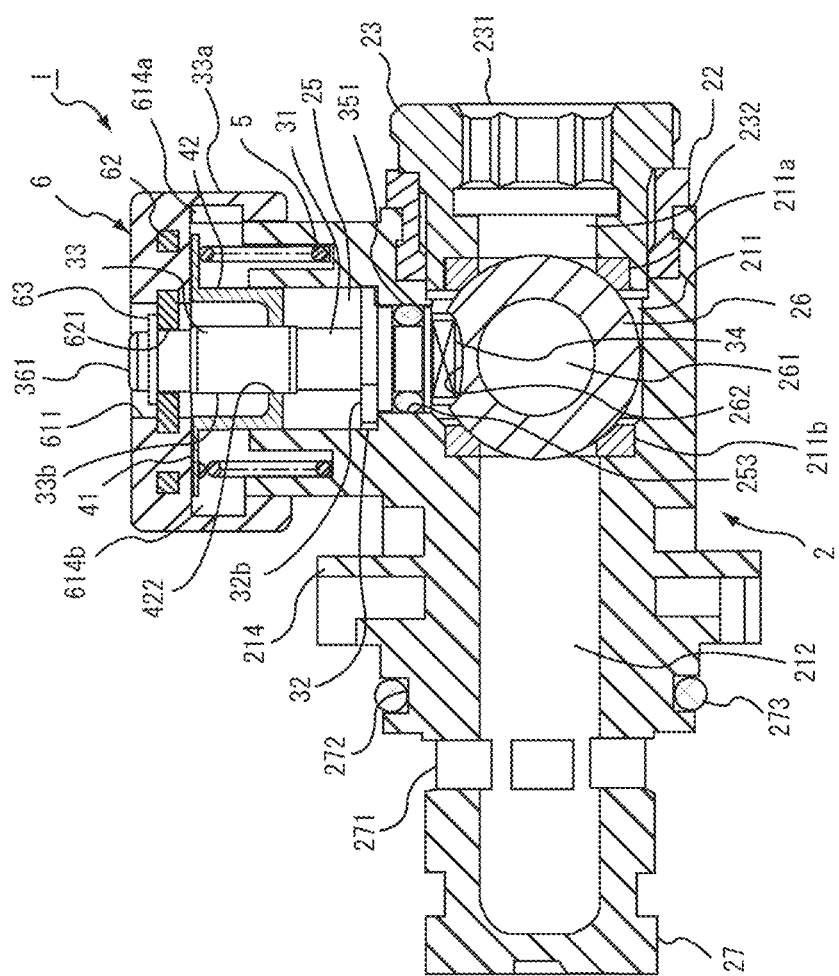
FIG. 11 shows a sectional side view of the opening and closing valve when the valve body according to the embodiment is in its closed position.
Figure 12:
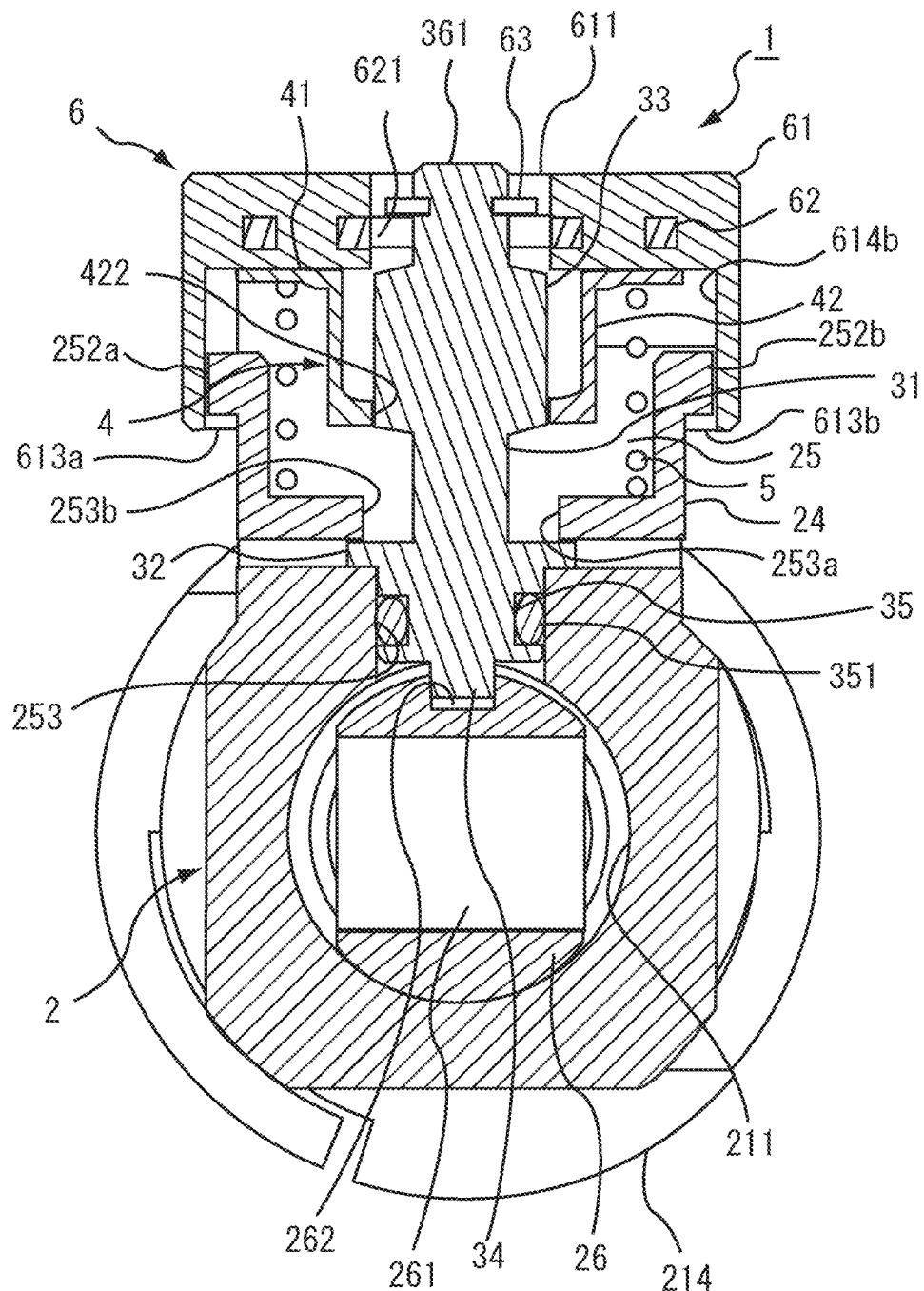
FIG. 12 shows a sectional front view of the opening and closing valve when the valve body according to the embodiment is in the closed position.

FIG. 11 is a sectional side view showing the valve body 26 in its closed position, and FIG. 12 is a sectional front view showing the same. In the state where the opening and closing valve 1 is assembled, the valve body 26 is in the closed position, and the operation dial 6 and the regulation member 4 are in their farthermost positions from the main body 2. More specifically, the second fitting hole 621 of the operation dial 6 is released from the fitter 33 to the location of the tip shaft portion 36, and thus the operation dial 6 becomes rotation-free with respect to the rotary shaft 3. In addition, the regulation member 4 is in its regulation position to allow the fitting hole 422 to fit into the fitter 33, thereby regulating, or locking, the rotation of the rotary shaft 3. As a consequence, when an external vibration and other external forces are exerted to the opening and closing valve 1, the rotation of the valve body 26 in the direction of the open position can be prevented because the rotary shaft 3 is locked.

As the engage convex portions 252a, 252b are in the positions inside the engage concave portions 613a, 613b of the operation dial 6, the operation of the operation dial 6 is also locked in the rotational direction. Furthermore, even in a case where the lock made by the engagement between the engage convex portions 252a, 252h and the engage concave portions 613a, 613b is broken when a high torque is applied to the operation dial 6, resulting in forcible rotation of the operation dial 6, the regulation member 4 maintains the closed state because the regulation member 4 is not under restraint of the rotation of the operation dial 6.

When the valve body 26 is in the closed position, the spring 5 in compression biases at all times the regulation member 4 and the operation dial 6 in the direction apart from the main body 2. In addition to that, the biasing force of the spring 5 is transmitted to the rotary shaft 3 via the stopper 63, and thereby the protruding portions 253a, 253b, which eventually overlap with the outer circumference of the jaw 32, receives the biasing force.

In order to switch the valve body 26 into the open position, the operation dial 6 is pushed in the direction of the main body 2 to move the engage convex portions 252a, 252b into the engage concave portions 613a, 613b, By pressing the operation dial 6, the regulation member 4 is also pushed to move in the direction of the valve body 26. The regulation member 4 is then guided to be translated in the axial direction by the engagement of the guide grooves 421a, 421b and the engagers 251a, 251b. When the operation dial 6 moves to the place where the dial can rotate, the first fitting hole 422 in the regulation member 4 comes off from the fitter 33 to move to the location of the shaft portion 31 which is a nonregulated position, and thus the regulation to the rotation of the rotary shaft 3 by the regulation member 4 is eliminated. Moreover, when the second fitting hole 621 engages with the titter 33, the operation dial 6 shifts to the integral rotation state to rotate together with the rotary shaft 3.

In the above state, when the operation dial 6 is rotated to permit the engage convex portions 252a, 252b to move relatively inside the engage concave portions 614a, 614b, the valve body 26 is rotated by 45 degrees to change into the open position, as shown in FIGS. 3 and 4.

In this way, the engage convex portions 252a, 252b and the engage concave portions 613a, 613b form rotation regulating means. Alternatively, the convex portions may be disposed inside the inner circumferential opening of the operation dial 6 while groove-like engage concave portions may be provided outside the shaft housing 24 in the inner and the circumferential direction.

The location for attaching the opening and closing valve 1 according to an embodiment of the present invention is not limited to the discharge port of the liquid container described above, but can be placed in the flow passage of the fluid. The fluid in the opening and closing valve 1 may flow opposite in direction. In addition, the regulation member 4 may be configured to lock the rotary shaft 3, instead of in the closed position, in the open position of the valve body 26.

The following additional disclosure is referenced:

1 [1]. An opening and closing valve disposed in a flow passage fora fluid and configured to control flow and interruption of the fluid, comprising:

a main body having a valve chamber, an inflow port located upstream of the flow passage and an outflow port located downstream of the follow passage;

a valve body housed in the valve chamber and having a flow passage member where the fluid flows, and configured to switch the flow of the fluid by rotating between an open position where the flow passage member connects the inflow port to the outflow port and a closed position where the flow is blocked between the inflow port and the outflow port;

a rotary shaft, disposed along a rotation axis of the valve body, with its base end connected to the valve body;

an operation member connected to the rotary shaft to operate the rotation of the valve body between the open position and the closed position; and a regulation member housed in the main body and passing through a center of the rotary shaft to connect movably in an axial direction to the rotary shaft, so as to move between a regulation position where the rotation of the rotary shaft is regulated and a non-regulation position where the rotation is not regulated, wherein the operation member is connected movably in the axial direction to the rotary shaft so as to enable to switch between an integral rotation state where the operation member rotates together with the rotary shall based on its moving position and a rotation-free state where the member and the shaft are mutually rotation-free, the regulation member being in the regulation position when the operation member and the rotary shall are in the rotation-free state.

2 [2]. The opening and closing valve in accordance with claim 1, wherein the regulation member is in the regulation position when the valve body is in the closed position.

3 [3-1]. The opening and closing valve in accordance with claim 1, wherein the regulation member is in the mutually rotation-free state with respect to the operation member.

4 [3-2]. The opening and closing valve in accordance with claim 2, wherein the regulation member is in the mutually rotation-free state with respect to the operation member.

5 [4-1]. The opening and closing valve in accordance with claim 1, wherein the operation member is in the rotation-free state when the valve body is in the closed, position.

6 [4-2], The opening and closing valve in accordance with claim 2, wherein the operation member is in the rotation-free state when the valve body is in the closed position.

7 [4-3-1]. The opening and closing valve in accordance with claim 3, wherein the operation member is in the rotation-free state when the valve body is in the closed position.

8 [4-3-2]. The opening and closing valve in accordance with claim 4, Wherein the operation member is in the rotation-free state when the valve body is in the closed position.

9 [5-1], The opening and closing valve in accordance with claim 1, further comprising a biasing member housed in the main body to bias the operation member into the rotation-free state.

10 [5-2]. The opening and closing valve in accordance with claim 2, further comprising a biasing member housed in the main body to bias the operation member into the rotation-free state.

11 [5-3-1]. The opening and closing valve in accordance with claim 3, further comprising a biasing member housed in the main body to bias the operation member into the rotation-free state.

12 [5-3-2]. The opening and closing valve in accordance with claim 4, further comprising a biasing member housed in the main body to bias the operation member into the rotation-free state.

13 [5-4-1]. The opening and closing valve in accordance with claim 5, further comprising a biasing member housed in the main body to bias the operation member into the rotation-free state.

14 [5-4-2]. The opening and closing valve in accordance with claim 6, further comprising a biasing member housed in the main body to bias the operation member into the rotation-free state.
15 [5-4-3-1]. The opening and closing valve in accordance with claim 7, further comprising a biasing member housed in the main body to bias the operation member into the rotation-free state.
16 [5-4-3-2]. The opening and closing valve in accordance with claim 8, further comprising a biasing member housed in the main body to bias the operation member into the rotation-free state.
17 [6-5-1]. The opening and closing valve in accordance with claim 9, wherein between the operation member and the main body, provided is rotation regulating means for regulating the rotation of the operation member in the rotation-free state.
18 [6-5-2]. The opening and closing valve in accordance with claim 10, wherein between the operation member and the main body, provided is rotation regulating means for regulating the rotation of the operation member in the rotation-free state.
19 [6-5-3-1]. The opening and closing valve in accordance with claim 11, wherein between the operation member and the main body, provided is rotation regulating means for regulating the rotation of the operation member in the rotation-free state.
20 [6-5-3-2]. The opening and closing valve in accordance with claim 12, wherein between the operation member and the main body, provided is rotation regulating means for regulating the rotation of the operation member in the rotation-free state.
21 [6-5-4-1]. The opening and closing valve in accordance with claim 13, wherein between the operation member and the main body, provided is rotation regulating means for regulating the rotation of the operation member in the rotation-free state.
22 [6-5-4-2]. The opening and closing valve in accordance with claim 14, wherein between the operation member and the main body, provided is rotation regulating means for regulating the rotation of the operation member in the rotation-free state.
23 [6-5-4-3-1]. The opening and closing valve in accordance with claim 15, wherein between the operation member and the main body, provided is rotation regulating means for regulating the rotation of the operation member in the rotation-free state.
24 [6-5-4-3-2]. The opening and closing valve in accordance with claim 16, wherein between the operation member and the main body, provided is rotation regulating means for regulating the rotation of the operation member in the rotation-free state.
25 [7-5-1]. The opening and closing valve in accordance with claim 9, wherein the regulation member is biased toward the regulation position by the biasing member.
26 [7-5-2]. The opening and closing valve in accordance with claim 10, wherein the regulation member is biased toward the regulation position by the biasing member.
27 [7-5-3-1]. The opening and closing valve in accordance with claim 11, wherein the regulation member is biased toward the regulation position by the biasing member.
28 [7-5-3-2]. The opening and closing valve in accordance with claim 12, wherein the regulation member is biased toward the regulation position by the biasing member.
29 [7-5-4-1]. The opening and closing valve in accordance with claim 13, wherein the regulation member is biased toward the regulation position by the biasing member.
30 [7-5-4-2]. The opening and closing valve in accordance with claim 14, wherein the regulation member is biased toward the regulation position by the biasing member.
31 [7-5-4-3-1]. The opening and closing valve in accordance with claim 15, wherein the regulation member is biased toward the regulation position by the biasing member.
32 [7-5-4-3-2]. The opening and closing valve in accordance with claim 16, wherein the regulation member is biased toward the regulation position by the biasing member.
33 [7-6-5-1] The opening and closing valve in accordance with claim 17, wherein the regulation member is biased toward the regulation position by the biasing member.
34 [7-6-5-2] The opening and closing valve in accordance with claim 18, wherein the regulation member is biased toward the regulation position by the biasing member.
35 [7-6-5-3-1] The opening and closing valve in accordance with claim 19, wherein the regulation member is biased toward the regulation position by the biasing member.
36 [7-6-5-3-2] The opening and closing valve in accordance with claim 20, wherein the regulation member is biased toward the regulation position by the biasing member.
37 [7-6-5-4-1] The opening and closing valve in accordance with claim 21, wherein the regulation member is biased toward the regulation position by the biasing member.
38 [7-6-5-4-2] The opening and closing valve in accordance with claim 22, wherein the regulation member is biased toward the regulation position by the biasing member.
39 [7-6-5-4-3-1] The opening and closing valve in accordance with claim 23, wherein the regulation member is biased toward the regulation position by the biasing member.
40 [7-6-5-4-3-2] The opening and closing valve in accordance with claim 24, wherein the regulation member is biased toward the regulation position by the biasing member.

What is claimed is:
1. An opening and closing valve disposed in a flow passage for a fluid and configured to control flow and interruption of the fluid, comprising:
   a main body having a valve chamber, an inflow port located upstream of the flow passage and an outflow port located downstream of the follow passage;
   a spherical valve body housed in the valve chamber and having a flow passage member where the fluid flows, and configured to switch the flow of the fluid by rotating between an open position where the flow passage member connects the inflow port to the outflow port and a closed position where the flow is blocked between the inflow port and the outflow port;
   a rotary shaft, disposed along a rotation axis of the valve body, with its base end connected to the valve body;
   an operation member connected to the rotary shaft to operate the rotation of the valve body between the open position and the closed position; and
   a regulation member housed in the main body and surrounding the rotary shaft to connect movably in an axial direction to the rotary shaft, so as to move between a regulation position where the rotation of the rotary shaft is prohibited and regulated and a non-regulation position where the rotation is not regulated, a rotary drive of the regulation member about a rotation axis of the rotary shaft being regulated,
   wherein the operation member is connected movably in the axial direction to the rotary shaft so as to enable to switch between an integral rotation state where the operation member rotates together with the rotary shaft based on its moving position and a rotation-free state where both the operation member and the rotary shaft are prevented from rotating, and wherein the regulation member is in the regulation position and configured to regulate the rotation of the rotary shaft directly when the operation member and the rotary shaft are in the rotation-free state.

2. The opening and closing valve in accordance with claim 1, wherein the regulation member is in the regulation position when the valve body is in the closed position.

3. The opening and closing valve in accordance with claim 2, wherein the operation member is in the rotation-free state when the valve body is in the closed position.

4. The opening and closing valve in accordance with claim 3, further comprising a biasing member housed in the main body to abut the regulation member and bias the operation member with the regulation member toward a tip of the rotary shaft.

5. The opening and closing valve in accordance with claim 2, further comprising a biasing member housed in the main body to abut the regulation member and bias the operation member with the regulation member toward a tip of the rotary shaft.

6. The opening and closing valve in accordance with claim 1, wherein the operation member is in the rotation-free state when the valve body is in the closed position.

7. The opening and closing valve in accordance with claim 6, further comprising a biasing member housed in the main body to abut the regulation member and bias the operation member with the regulation member toward a tip of the rotary shaft.

8. The opening and closing valve in accordance with claim 1, further comprising a biasing member housed in the main body to abut the regulation member and bias the operation member with the regulation member toward a tip of the rotary shaft.

9. The opening and closing valve in accordance with claim 8, wherein the rotary shaft is surrounded by the biasing member and disposed along the rotation axis of the valve body.

10. The opening and closing valve in accordance with claim 1, wherein the rotary drive of the regulation member about the rotation axis of the rotary shaft is regulated regardless of the regulation position and the non-regulation position.

* * * * *